(12) United States Patent
Salaverry et al.

(10) Patent No.: US 8,477,106 B2
(45) Date of Patent: Jul. 2, 2013

(54) SYSTEM AND METHOD FOR A PROJECTED CAPACITIVE TOUCHSCREEN HAVING WEIGHT BASED COORDINATE DETERMINATION

(75) Inventors: Ricardo R. Salaverry, San Jose, CA (US); Joel C. Kent, Fremont, CA (US); James L. Aroyan, Santa Cruz, CA (US)

(73) Assignee: ELO Touch Solutions, Inc., Milpitas, CA (US)

( * ) Notice: Subject to any disclaimer, the term of this patent is extended or adjusted under 35 U.S.C. 154(b) by 849 days.

(21) Appl. No.: 12/511,449

(22) Filed: Jul. 29, 2009

(65) Prior Publication Data
US 2011/0025638 A1 Feb. 3, 2011

(51) Int. Cl.
*G06F 3/041* (2006.01)

(52) U.S. Cl.
USPC .......................................... 345/173; 345/174

(58) Field of Classification Search
USPC ...... 345/173, 174; 178/18.05, 18.06; 324/678
See application file for complete search history.

(56) References Cited

U.S. PATENT DOCUMENTS

| 4,087,625 | A | 5/1978 | Dym et al. |
|---|---|---|---|
| 4,103,252 | A | 7/1978 | Bobick |
| 4,495,485 | A | 1/1985 | Smith |
| 4,659,874 | A | 4/1987 | Landmeier |
| 4,686,332 | A | 8/1987 | Greanias et al. |
| 4,778,951 | A | 10/1988 | Pepper, Jr. et al. |
| 4,954,823 | A | 9/1990 | Binstead |
| 4,980,519 | A | 12/1990 | Mathews |
| 4,999,462 | A | 3/1991 | Purcell |
| 5,117,071 | A | 5/1992 | Greanias et al. |
| 5,650,597 | A | 7/1997 | Redmayne |
| 5,694,154 | A | 12/1997 | Knox et al. |
| 5,844,506 | A | 12/1998 | Binstead |
| 5,847,690 | A | 12/1998 | Boie et al. |
| 6,288,707 | B1 | 9/2001 | Philipp |
| 6,297,811 | B1 * | 10/2001 | Kent et al. ..................... 345/173 |
| 6,537,150 | B1 * | 3/2003 | Luciano et al. ................ 463/16 |

(Continued)

FOREIGN PATENT DOCUMENTS

| EP | 2045698 | 4/2009 |
|---|---|---|
| WO | WO88/005577 | 7/1988 |

(Continued)

OTHER PUBLICATIONS

International Search Report of PCT/US2010/041900 (counterpart of U.S. Appl. No. 12/511,449).

(Continued)

*Primary Examiner* — Quan-Zhen Wang
*Assistant Examiner* — Calvin C Ma
(74) *Attorney, Agent, or Firm* — Alston & Bird LLP

(57) ABSTRACT

A touch location on a capacitive touchscreen system is identified by receiving signals in response to a touch from electronic channels connected to one electrode or to a group of semi-adjacent electrodes provided on a substrate. Adjacent ones of the electrodes have substantially triangular shapes that alternate between a first and second orientation to form an interleaved arrangement such that the touch generates a signal cluster comprising the signals generated from a series of adjacent electronic channels. Weights with at least two different numerical values are applied to the signals from the series of adjacent electronic channels. The at least two different numerical values are based on levels of the signals. A location of the touch on the substrate is determined based on the weighted signals.

20 Claims, 8 Drawing Sheets

U.S. PATENT DOCUMENTS

| | | |
|---|---|---|
| 6,787,715 B2 * | 9/2004 | Chao et al. ............... 178/18.01 |
| 6,879,930 B2 | 4/2005 | Sinclair et al. |
| 7,218,124 B1 | 5/2007 | Mackey et al. |
| 2003/0067451 A1 | 4/2003 | Tagg et al. |
| 2006/0097991 A1 * | 5/2006 | Hotelling et al. ............. 345/173 |
| 2006/0244732 A1 | 11/2006 | Geaghan |
| 2007/0247443 A1 | 10/2007 | Philipp |
| 2007/0257894 A1 | 11/2007 | Philipp |
| 2007/0279395 A1 | 12/2007 | Philipp et al. |
| 2008/0074398 A1 | 3/2008 | Wright |
| 2008/0246496 A1 | 10/2008 | Hristov et al. |
| 2008/0259044 A1 | 10/2008 | Utsunomiya et al. |
| 2009/0194344 A1 | 8/2009 | Harley et al. |
| 2009/0303231 A1 | 12/2009 | Robinet et al. |
| 2010/0000675 A1 | 1/2010 | Kim et al. |
| 2010/0001973 A1 | 1/2010 | Hotelling et al. |
| 2010/0051355 A1 | 3/2010 | Yang |
| 2010/0079393 A1 | 4/2010 | Dews |
| 2010/0295813 A1 | 11/2010 | Kent |
| 2010/0295814 A1 | 11/2010 | Kent et al. |
| 2011/0025636 A1 | 2/2011 | Ryu |
| 2011/0141051 A1 | 6/2011 | Ryu |

FOREIGN PATENT DOCUMENTS

| | | |
|---|---|---|
| WO | WO-96/15464 | 5/1996 |
| WO | WO 2010/134947 A1 | 11/2010 |
| WO | WO 2010/134948 A1 | 11/2010 |
| WO | WO 2011/016956 A1 | 2/2011 |

OTHER PUBLICATIONS

U.S. Appl. No. 12/471,194, Notice of Allowance issued Jun. 7, 2012.
U.S. Appl. No. 12/471,016, Final Rejection issued Jun. 28, 2012.
U.S. Appl. No. 12/471,016, Final Rejection issued Jun. 28, 2012.
International Preliminary Report on Patentability issued Jan. 31, 2012 for PCT/US2010/041900.
International Preliminary Report on Patentability issued Nov. 22, 2011 for PCT/US2010/001321.
International Preliminary Report on Patentability issued Nov. 22, 2011 for PCT/US2010/001320.
International Search Report of PCT/US2010/001320.
U.S. Appl. No. 12/471,016, Non-Final Rejection mailed Dec. 6, 2011.
U.S. Appl. No. 12/471,194, Non-Final Rejection mailed Dec. 27, 2011.
U.S. Appl. No. 12/471,194, Notice of Allowance mailed Sep. 6, 2012.
U.S. Appl. No. 12/471,016, Non-Final Rejection mailed Mar. 28, 2013.

* cited by examiner

SYSTEM AND METHOD FOR A PROJECTED CAPACITIVE TOUCHSCREEN HAVING WEIGHT BASED COORDINATE DETERMINATION

BACKGROUND OF THE INVENTION

The subject matter disclosed herein relates generally to touchscreens and touchscreen systems, and more particularly to projected capacitive touchscreens.

In a projected capacitive touchscreen, an outer surface may be provided over one or more layers having sense electrodes or sensors formed thereon. In contrast to common resistive touchscreens, the outer surface of a projected capacitive touchscreen may be a durable glass surface having high optical transparency for viewing images displayed by an underlying display device. The touchscreen may be positioned over a display device that displays graphical selections such as buttons and icons. When a user touches the outer surface with a finger, corresponding to a desired selection displayed on the display device, the touchscreen system senses a change in capacitance associated with one or more of the electrodes. "Projected capacitive" touchscreen is in contrast to a "surface capacitive" touchscreen that has a single sensing electrode covering the entire touch area. As used herein, "projected capacitive touchscreen" generalizes to any capacitive touchscreen with a plurality of sensing electrodes in the touch sensitive area.

Some projected capacitive touchscreens use a "backgammon" type of configuration for the electrodes. In this configuration, the electrodes are elongated triangles formed on a single surface. The orientation of adjacent electrodes alternates, wherein a base of a first electrode is positioned proximate one edge of the surface and the base of the next or adjacent electrode is positioned proximate the opposite edge of the surface. Such electrode geometry is reminiscent of a backgammon game board pattern. Such designs have the cost advantage of providing two-dimensional touch coordinates with a single plane of sense electrodes.

Backgammon touchscreen designs typically have a large number of narrow electrodes so that each touch is detected by at least two electrodes. For example, in some backgammon systems the electrodes detect signals that are used to determine both the X and Y coordinates. If each touch is detected by a very large number of electrodes, a fraction of the total signal on the electrodes that are oriented the same way provides an accurate measure of one of the coordinates, such as the Y or vertical coordinate. However, typically each touch is detected by a more modest number of electrodes and as a result the fraction of the total signal on the electrodes that are oriented in the same way may not provide an accurate and reliable coordinate measurement. There is a need for improved coordinate determinations based on touch induced electrode signals.

BRIEF DESCRIPTION OF THE INVENTION

In one embodiment, a capacitive touchscreen system includes a substrate, electrodes, a controller and electronic channels. The substrate comprises a touch sensitive area. The electrodes are provided on the substrate within the touch sensitive area and have substantially triangular shapes. The electrodes are interlaced with one another in a non-overlapping pattern on the substrate and generate corresponding signals in response to a touch on the substrate. The electronic channels are within the controller, and each of the electronic channels are connected to one electrode or to a group of semi-adjacent electrodes. The controller detects the signals from the electronic channels and identifies a signal cluster comprising the signals from a series of at least two adjacent electronic channels. The controller identifies the electronic channel within the series that has a local maximum signal, and applies a weight with a first numerical value to the signal from the electronic channel that has the local maximum signal and applies a weight with a second numerical value to the signal from another electronic channel within the series. The first numerical value is different than the second numerical value, and the controller determines a location of the touch based on the weighted signals.

In another embodiment, a method for identifying a touch location on a capacitive touchscreen system comprises receiving signals in response to a touch from electronic channels connected to one electrode or to a group of semi-adjacent electrodes provided on a substrate. Adjacent ones of the electrodes have substantially triangular shapes that alternate between a first and second orientation to form an interleaved arrangement such that the touch generates a signal cluster comprising the signals generated from a series of adjacent electronic channels. Weights with at least two different numerical values are applied to the signals from the series of adjacent electronic channels. The at least two different numerical values are based on levels of the signals. A location of the touch on the substrate is determined based on the weighted signals.

DETAILED DESCRIPTION OF THE INVENTION

Figure 1:
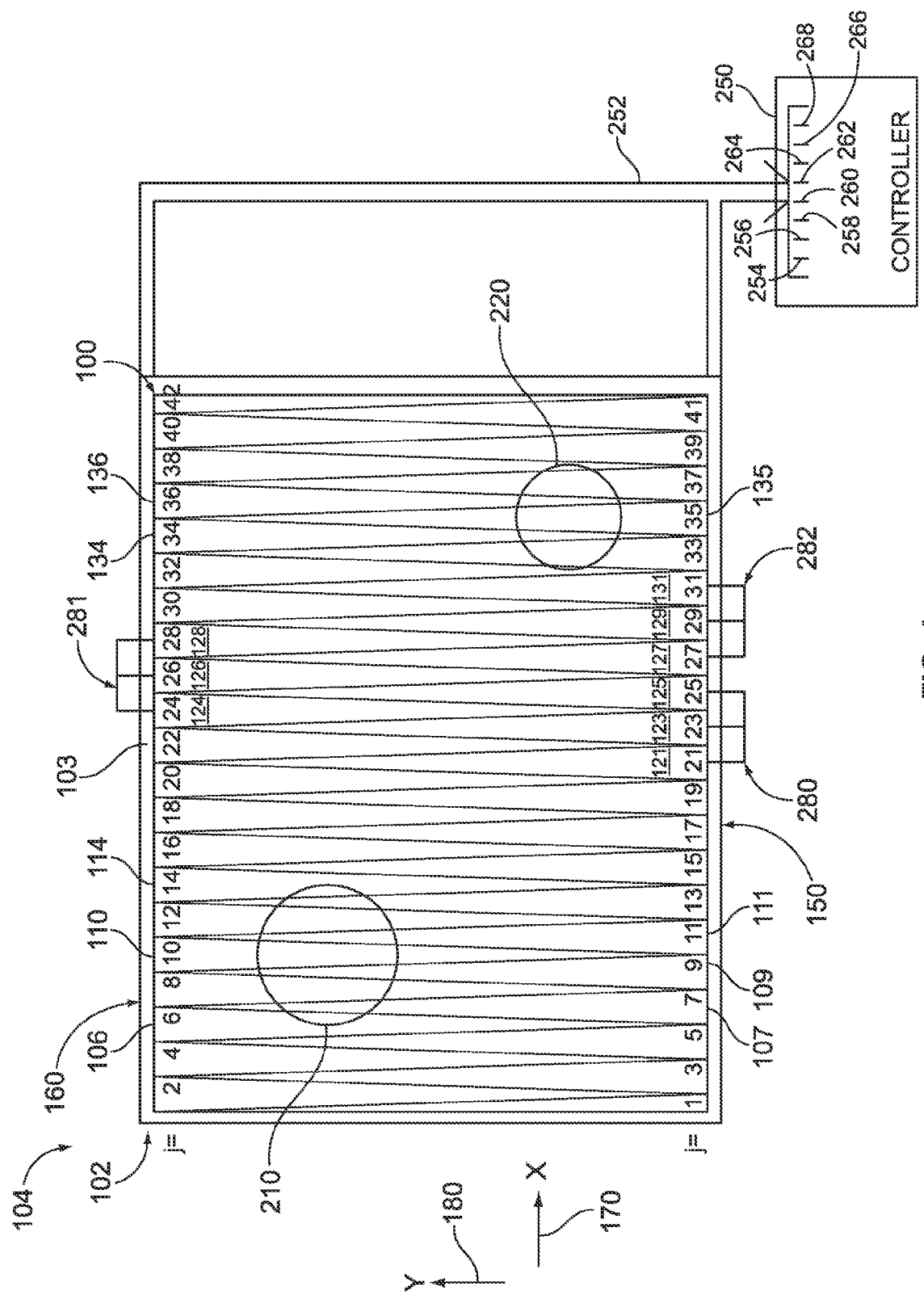
FIG. 1 illustrates a touch sensitive area of a backgammon touchscreen formed in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 illustrates a touch sensitive area 100 of a projected capacitive touchscreen 102 within a projected capacitive touchscreen system 104. The touch sensitive area 100 includes a number of electrodes that have substantially triangular shapes and that are interlaced with one another in a non-overlapping pattern on a substrate 103. The electrodes may be sequentially numbered with an index "j" running from 1 to J where J is the total number of electrodes. For the example illustrated in FIG. 1, J is equal to 42. All the electrodes with an odd value of j, such as electrodes 107, 109, 111 and 135 with j indices of 7, 9, 11 and 35, respectively, are oriented the same way, namely with bases at bottom edge 150 of the touch sensitive area 100 and apexes at top edge 160 of the touch sensitive area 100. Electrodes such as electrodes 106, 110, 114, 134 and 136 with j index values of 6, 10, 14, 34 and 36 have even j indices and also have a common orientation that is opposite to the orientation of the electrodes with odd j indices.

As used herein, the term "adjacent electrodes" refers to nearest-neighbor electrodes that are next to each other and have opposite orientation. For example, electrode 107 is adjacent to both electrodes 106 and electrode 108, and electrode 108 is adjacent to both electrodes 107 and 109. Therefore, the orientations of adjacent electrodes alternate with respect to each other between first and second orientations to form an interleaved arrangement. Also as used herein, the term "semi-adjacent electrodes" refers to nearest-neighbor electrodes that have the same orientation. For example, electrode 107 is semi-adjacent to electrode 109, and electrode 109 is semi-adjacent to both electrodes 107 and 111.

Capacitance measuring electronic channels 254, 256, 258, 260, 262, 264, 266 and 268 are provided within controller 250 and are each connected to one electrode or to a group of semi-adjacent electrodes. As discussed herein, a "group" includes a minimum of two semi-adjacent electrodes. Groups of electrodes may be connected together via traces on the substrate 103, within cable 252, or within the controller 250. Group connections within the controller 250 may be hardwired, for example, or may be dynamically changed. It should be understood that different controllers 250 may have different numbers of electronic channels, and that the number of electronic channels is not limited to any particular number.

As used herein, the term "adjacent electronic channels" refers to electronic channels that are connected to adjacent groups of semi-adjacent electrodes. A group 280 may include signals generated by the semi-adjacent electrodes 121, 123 and 125, while a group 282 may include signals generated by the semi-adjacent electrodes 127, 129 and 131. Yet another group 281 may include signals generated by the semi-adjacent electrodes 124, 126 and 128. The groups 280 and 281 are adjacent with respect to each other and the groups 281 and 282 are adjacent with respect to each other. The groups 280 and 282 are semi-adjacent with respect to each other. The group 280 may be connected to the electronic channel 254 while the group 281 may be connected to the electronic channel 256, and thus the electronic channels 254 and 256 are adjacent with respect to each other. It should be understood that adjacent electronic channels do not need to be physically adjacent within the controller 250. For example, electronic channels 254 and 266 would be adjacent to each other if the group 280 is connected to the electronic channel 254 and the group 281 is connected to the electronic channel 266.

Figure 8:
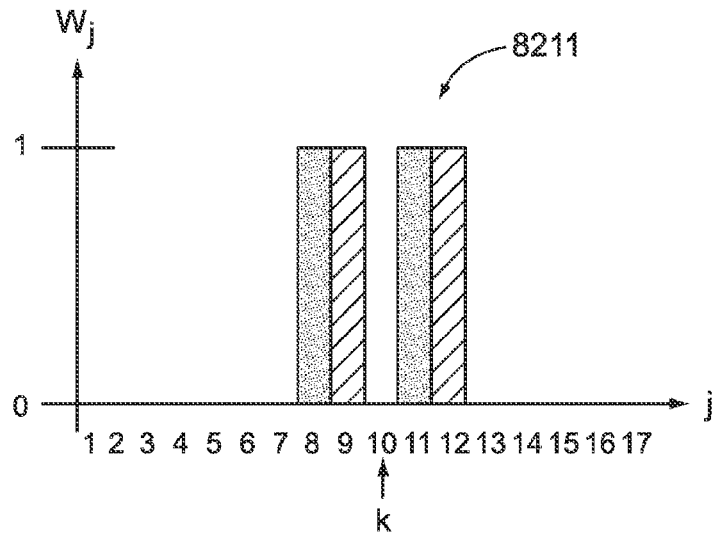
FIG. 8 illustrates weights for balanced weighting in accordance with an embodiment of the present invention.
Figure 9:
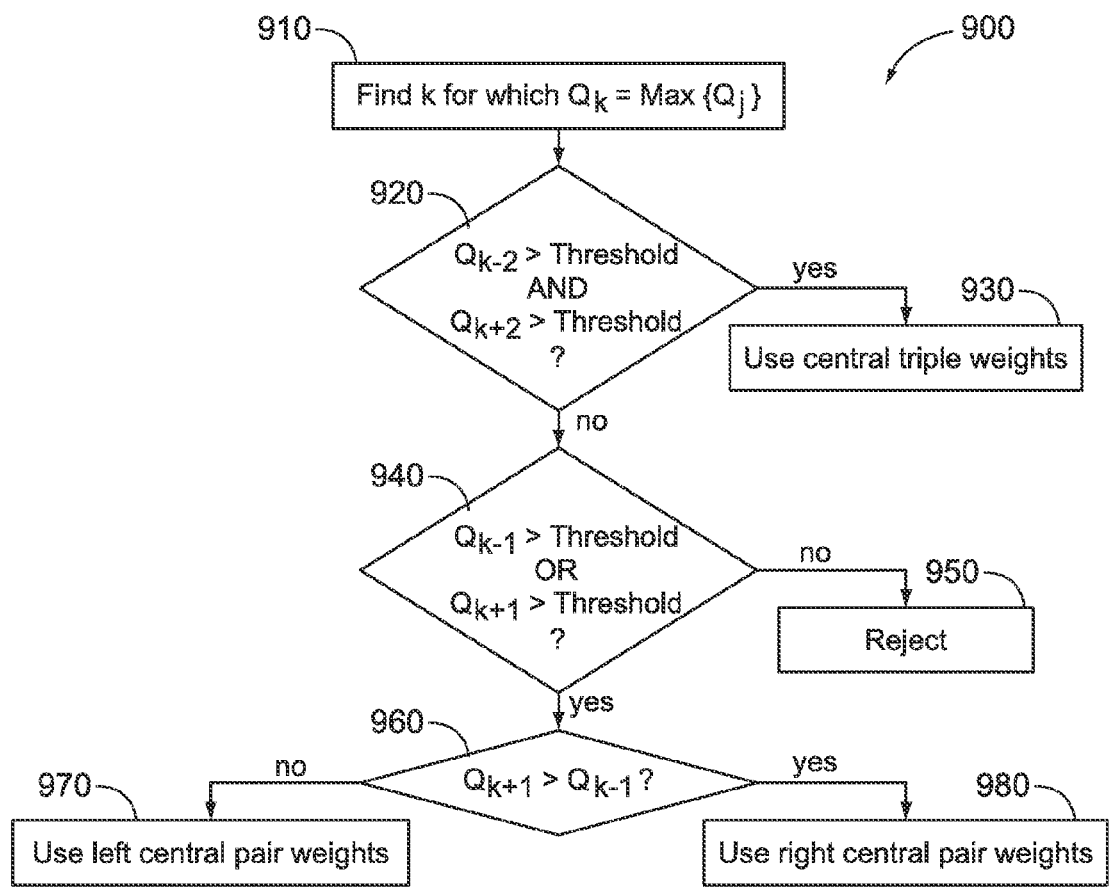
FIG. 9 illustrates a flow chart for a conditional weighting scheme in accordance with an embodiment of the present invention.
Figure 10:
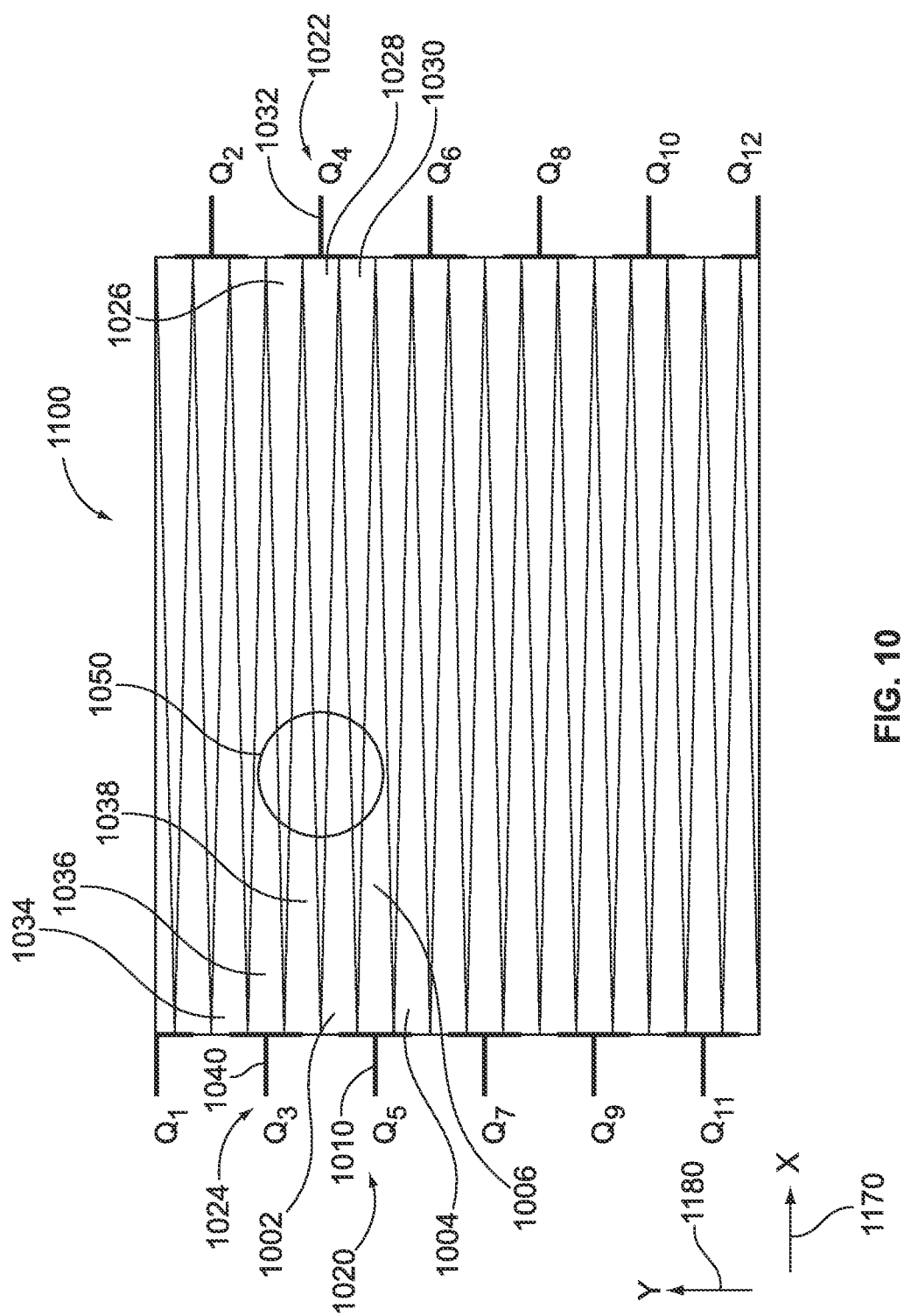
FIG. 10 illustrates a backgammon electrode geometry with grouped horizontal electrodes formed in accordance with an embodiment of the present invention.

As discussed with respect to FIGS. 1-9, each electrode is connected in a one-to-one correspondence with one electronic channel for discussion purposes. In FIG. 10, groups of semi-adjacent electrodes formed, and each group is connected in a one-to-one correspondence with one electronic channel.

The electronic channels 254-268 detect signals from the electrodes via the cable 252, and the controller 250 detects the signals from the electronic channels 254-268. The cable 252 may be connected to traces (not shown) on the substrate 103 that are located beyond the touch sensitive area 100.

A touch on the touchscreen 102 with an object or finger results in touch contact area 210, indicated by a circle, which will generate capacitive signals in electrodes with j indices 6 through 14 where the amplitude of each of the signals depends of the area of overlap between the touch contact area 210 and the electrode. In general, a larger area of overlap results in the corresponding electrode producing a larger or higher amplitude of the signal, while relatively smaller areas of overlap result in relatively smaller amplitude levels. In one embodiment, the electrode with the largest area of overlap within the touch contact area 210 will result in the maximum signal level associated with the touch. With respect to the touch contact area 210, more than half of the touch signal is detected in the even numbered electrodes, thus indicating that the touch is closer to the top edge 160 of the touch sensitive area 100 than the bottom edge 150. In contrast, a different touch with touch contact area 220 will generate less than half of the touch signal in even numbered electrodes, thus indicating a touch that is closer to the bottom edge 150 of touch sensitive area 100.

Figure 1A:
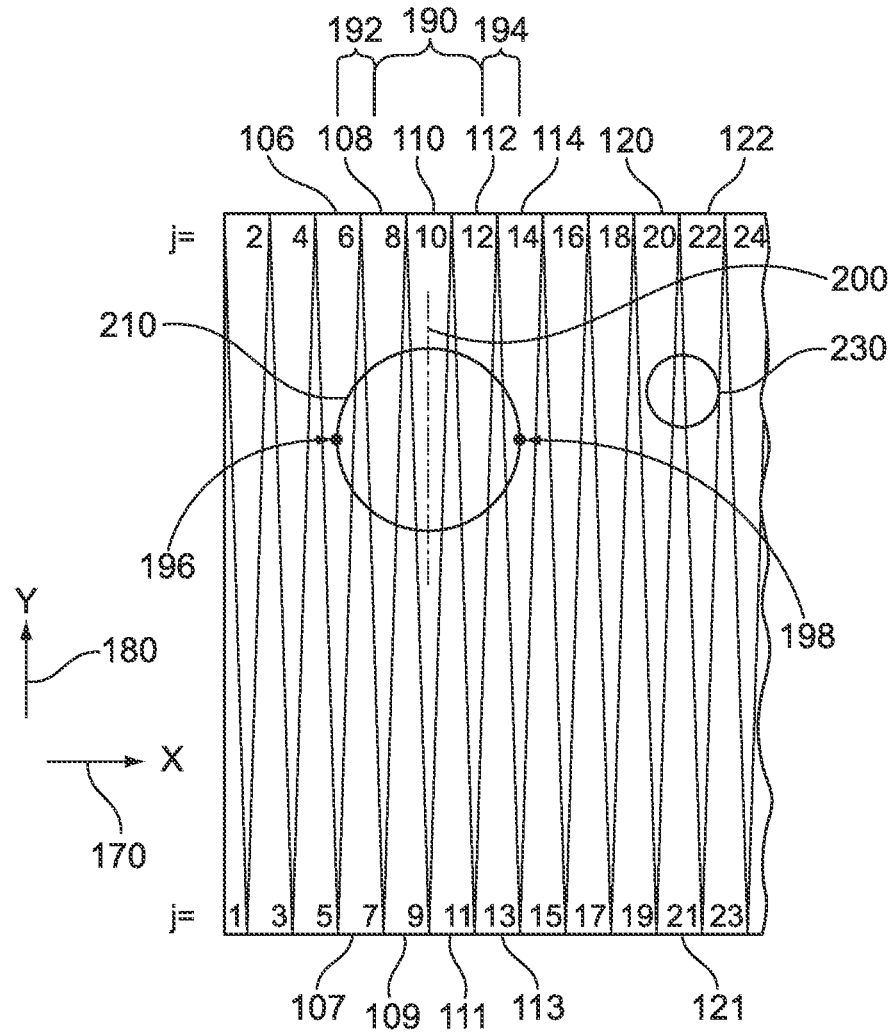
FIG. 1A illustrates several touch contact areas associated with touches on the touchscreen of FIG. 1 in accordance with an embodiment of the present invention.

FIG. 1A further illustrates the touch contact area 210 and a relatively smaller touch contact area 230. The controller 250 of FIG. 1 may define the touch contact area 210 based on signal levels from electrodes or electronic channels that are adjacent to each other. In one embodiment, a touch contact area may comprise at least two adjacent electrodes or at least two adjacent electronic channels that produce signal levels that are greater than a predetermined signal threshold. The series of electronic channels that detect the touch contract area 210 are distinct from the series of electronic channels that detect the touch contact area 230.

Turning to the touch contact area 210, the controller 250 detects signals from a series of adjacent electrodes 106, 107, 108, 109, 110, 111, 112, 113 and 114 that exceed a signal threshold. For example, the signal threshold may be a minimum amplitude level. Therefore, the size of the touch contact area 210 extends over nine adjacent electrodes, with extremity points 196 and 198 of the touch contact area 210 being defined at outer edges along the X direction 170. The signals from the adjacent electrodes 106-114 may be referred to as local signals, as each of the signals is associated with the touch contact area 210. There may be one local maximum signal, such as a local maximum signal amplitude, associated with the touch contact area 210. In contrast, signals from the series of adjacent electrodes 120, 121 and 122 are associated with the touch contact area 230. There is a different local maximum signal associated with the touch contact area 230. Therefore, at any given time there may be more than one local maximum signal detected by the controller 250, wherein each touch contact area has a different local maximum signal. It should be understood that the controller 250 may detect more than two local maximum signals simultaneously if more than two touch contact areas are present simultaneously. The two or more touch contact areas may be considered to occur simultaneously if the contact areas are detected during the same time period.

The electrode 110 has the maximum overlap with touch contact area 210 and hence is the electrode generating the largest signal. One or both of the electrodes 106 and 114 have the minimum overlap with touch contact area 210 and hence are the electrodes generating the smallest signal(s). With respect to the lateral or X direction, electrode 110 is close to a center 200 of touch contact area 210 and may overlap the center 200 of contact area 210. Of the electrodes 106 through 114 that overlap contact area 210, electrode 110 has the maximum, or close to maximum, overlap with touch contact area 210 in the Y direction. The electrodes 109 and 111 that are adjacent to electrode 110 have close to, but slightly less than, the same length of overlap in the Y direction with contact area 210 as electrode 110. The length of overlap in the Y direction may vary only slightly for electrodes such as electrodes 109, 110 and 111 that are located in an interior region 190 of the touch contact area 210. When calculating coordinates, Y coordinate calculations that favor or apply weight(s) with larger numerical values to the signals from the electronic channel(s) associated with electrode(s) or group(s) of electrodes in interior region 190, in contrast to signals from the electronic channel(s) associated with electrode(s) or group(s) of electrodes in boundary regions 192 and 194, produce more reliable Y coordinate results. In other words, in some embodiments more reliable Y coordinate results may be achieved when electrode signals from electronic channels at or near the electronic channel that has the local maximum signal have weights applied that have larger numerical values than the electronic channels that are further from the electronic channel that has the local maximum signal.

As discussed above, the extremity points 196 and 198 are located at the extreme left and right sides of the touch contact area 210 along the X direction 170. The length of overlap in the Y direction between electrodes 106 and 114 and touch contact area 210 is much less than the Y direction overlap distance for electrodes such as 109, 110, and 111, which are in interior region 190. The Y overlap distance varies rapidly between electrodes 106 and 107 and likewise varies rapidly between electrodes 114 and 113. Associated with extremity points 196 and 198 are boundary regions 192 and 194, respectively, in which Y overlap distances vary rapidly from electrode to electrode. The boundary regions 192 and 194 may each include one or more electrode. In one embodiment, Y coordinate calculations that disfavor, weight with smaller numerical values, or ignore completely the signals from electronic channels associated with electrodes in boundary regions 192 and 194 produce more reliable coordinate results. Therefore, Y coordinate results are improved when signals from electronic channels that are closer to and, in some cases including, the electronic channel with the local maximum signal are more heavily weighted, that is, have weights applied with relatively larger numerical values, and signals from electronic channels further from the electronic channel with the local maximum signal are less heavily weighted, that is, have weights applied with relatively smaller numerical values. As used herein with respect to the electrodes and electronic channels, "close to", "closer to" and "further from" refer to geometrical distances of the electrodes with respect to each other.

Turning to the touch contact area 230, the touch contact area 230 is smaller than the touch contact area 210 and a fewer number of electrodes generate touch signals. Only three electrodes 120, 121, and 122 are at least partially traversed by the touch contact area 230. For a small contact area such as contact area 230, the contact area is not well separated into an interior region and boundary regions. For contact area 230, the electrode with contact area overlap and hence maximum signal amplitude is electrode 122. Even for a small contact area such as contact area 230, Y coordinate results may be improved when signals from electrodes close to and/or including the electrode with the local maximum signal are more heavily weighted while signals from electrodes further from the electrode with the local maximum signal are less heavily weighted.

Figure 2:
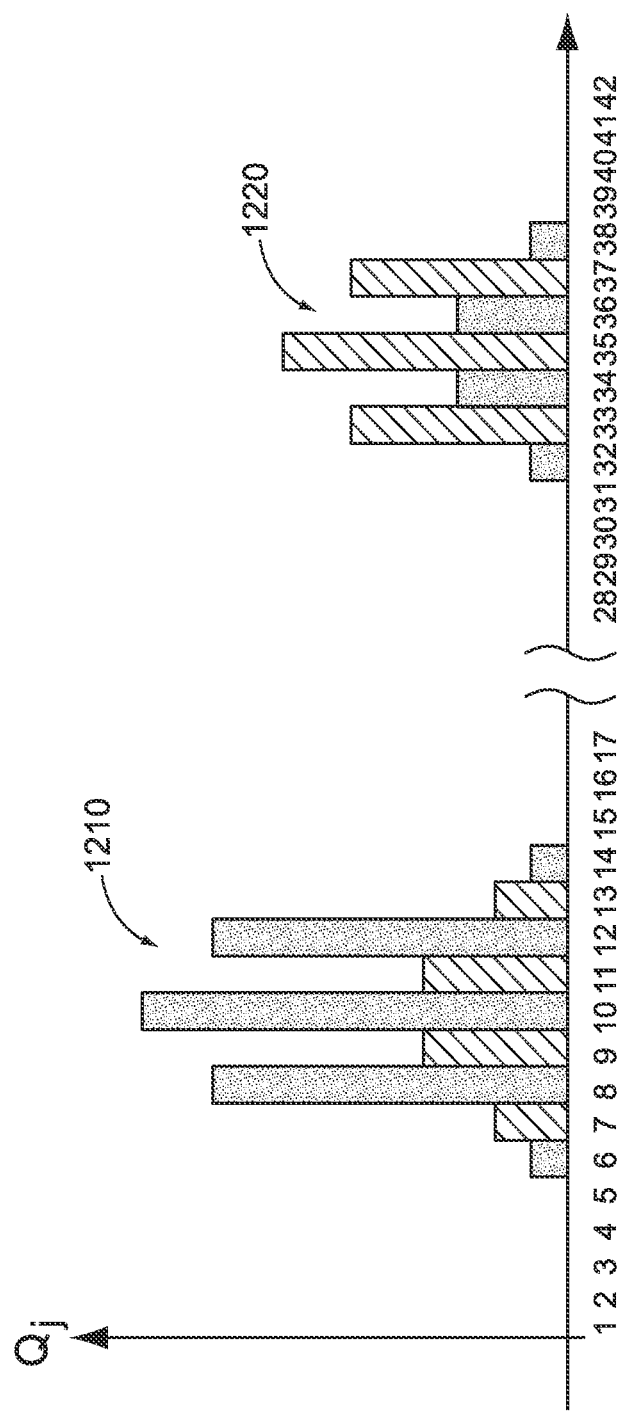
FIG. 2 illustrates touch signals as a function of electrode index for the two touches shown in FIG. 1 in accordance with an embodiment of the present invention.

Equations (1) and (2) present conventional methods for computing horizontal coordinate X in direction 170 and a vertical coordinate Y in direction 180 as a function of touch induced signals $Q_j$ detected on each electrode of index j. FIG. 2 shows a plot of touch induced signal $Q_j$ as a function of index j for the two touch contact areas 210 and 220 of FIG. 1. The touch induced signal indicates an amplitude or level of detected signal associated with an electrode. As discussed previously, FIG. 2 assumes a one-to-one relationship between each electrode and electronic channel. There are two signal clusters 1210 and 1220 of non-zero signals that correspond to the touch contact areas 210 and 220, respectively. Equations (1) and (2) may be applied separately to signal clusters 1210 and 1220 to determine the locations of the touch contact areas 210 and 220, respectively. The sums in Equations (1) and (2) are over a range of indices j including all non-zero signals of the cluster. For example, for signal cluster 1210 the sum may include the values of j from 6 through 14. Optionally, in cases where only a single touch is expected, the sums and Equations (1) and (2) may be extended over the entire range of electrode index j. The sum in the denominator of both Equations (1) and (2) is the total touch signal for the touch contact area within the range of electrode index j.

$$X=(\Sigma j \cdot Q_j)/(\Sigma Q_j) \quad (1)$$

$$Y=(\Sigma (-1)^j \cdot Q_j)/(\Sigma Q_j) \quad (2)$$

When using Equations (1) and (2) with the configuration shown in FIG. 1 wherein the triangular electrodes extend along the Y axis of the touchscreen 102, Equation (1) provides X coordinates of sufficient quality for many applications. However, Y coordinates computed using Equation (2) often have errors that are unacceptably large.

Equation (2) can be rewritten in terms of the sum of touch induced signals over even numbered electrodes of a cluster, $Q_{even}$, and the sum of signals over odd numbered electrodes of a cluster, $Q_{odd}$, as Equation (3). In FIG. 2, the signals contributing to the sum over even electrode signal sum $Q_{even}$ even are shown as solid shaded and the signals contributing to the odd electrode signal sum $Q_{odd}$ are shown as shaded with lines.

$$Y=(Q_{even}-Q_{odd})/(Q_{even}+Q_{odd}) \quad (3)$$

The coordinate Y as defined by Equations (2) and (3) is scaled and offset so that the center of the touchscreen corresponds to a zero value of Y and the mathematically possible range of Y is from negative one to positive one (for non-negative $Q_j$). With no change in conceptual content, the form of Equations (2) and (3) may be modified by changes in origin offset and scale magnification. For example, a rescaled and offset vertical coordinate $Y'=(Y+1)/2$ may be defined with a range from zero to one, and Equation (3) takes the form of Equation (4). It is understood by one skilled in the art that X and Y coordinates may be arbitrarily offset and scaled to move the origin $(x,y)=(0,0)$ and adjust the unit of coordinate distance to best suit applications of interest. In some embodiments, a Y coordinate definition in which the origin is symmetrically placed at the center of the touch sensitive area 100 as is implied by Equations (2) and (3) may be used.

$$Y'=Q_{even}/(Q_{even}+Q_{odd}) \quad (4)$$

Equation (2) equally weights all signals within a signal cluster associated with a touch contact area. In one embodiment, Y coordinates may be calculated by applying a weight with a larger numerical value to more heavily weight electrode signals from one or more electronic channels, such as the electronic channel associated with interior electrode 110 discussed in FIG. 1A, which is located near the center 200 of the touch contact area 210, such as within the interior region 190. A weight with a smaller numerical value may be applied to more lightly weight electrode signals from electronic channels associated with electrodes near one of the extremity points 196 and 198 of the touch contact area 210, and/or to more lightly weight electrode signals from electronic channels associated with electrodes that are located away from the center 200 of the touch contact area 210, which may be within the interior region 190 and/or within the boundary regions 192 and 194. For example, Equation (5) may be formed by replacing the sums ($Q_j$) in Equation (2) with weighted sums where $w_j$ is a weight associated with electrode j. For the special case that the numerical values of all weights are one, $w_j=1$, Equation (5) reduces to Equation (2) and hence the conventional method may be described as applying weights that have equal numerical values to all signals in a signal cluster.

$$Y=(\Sigma(-1)^j \cdot w_j \cdot Q_j)/(\Sigma w_j \cdot Q_j) \quad (5)$$

Figure 3:
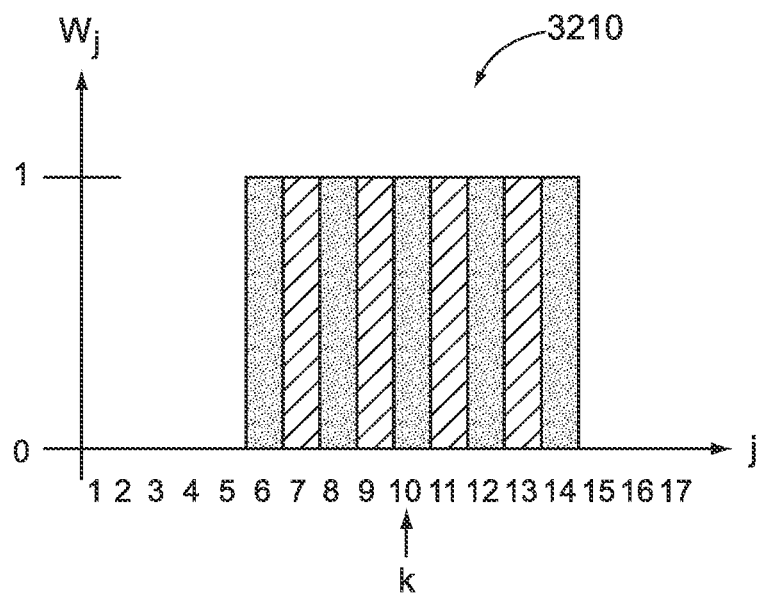
FIG. 3 illustrates weights for conventional touch location identification methods.

To provide an uneven or unequal weighting to the signals associated with the touch contact area, let "k" be the index of the electrode with the local maximum signal of the signal cluster. For example, referring to FIG. 2, for signal cluster 1210 the value of k is 10 and for signal cluster 1220 the value of k is 35. For the signal cluster 1210 of FIG. 2, FIG. 3 illustrates the $w_j=1$ equal weighting 3210 implied by conventional Y calculation using Equation (2). In this example, equal weighting 3210 is applied to the signals from the electrodes with j indices from 6 to 14.

In some embodiments, the position of the touch may be determined by selecting unequal weights $w_j$ wherein larger weights tend to be selected for values of j closer to k and smaller weights tend to be selected for values of j further from k. Several weighting schemes applying this weighting pattern are discussed below.

Figure 4A:
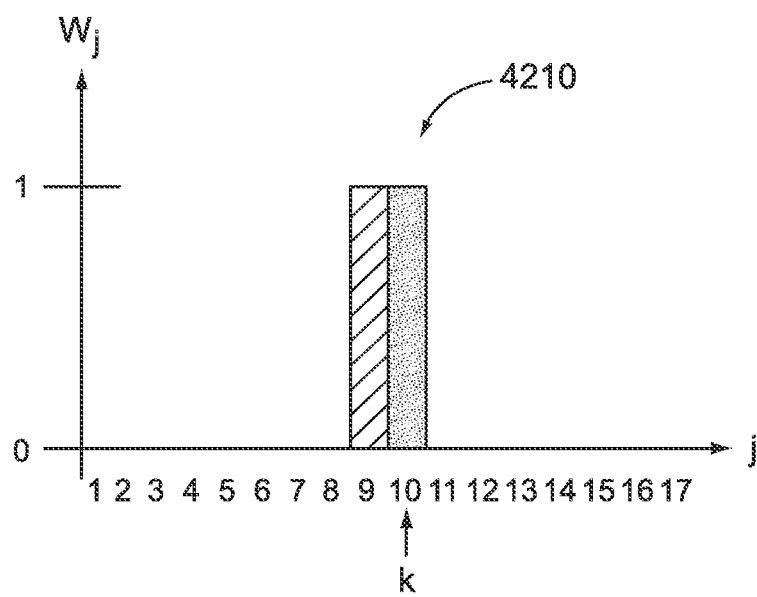
FIGS. 4A and 4B illustrate weights for left central pair weighting and right central pair weighting, respectively, in accordance with an embodiment of the present invention.
Figure 4B:
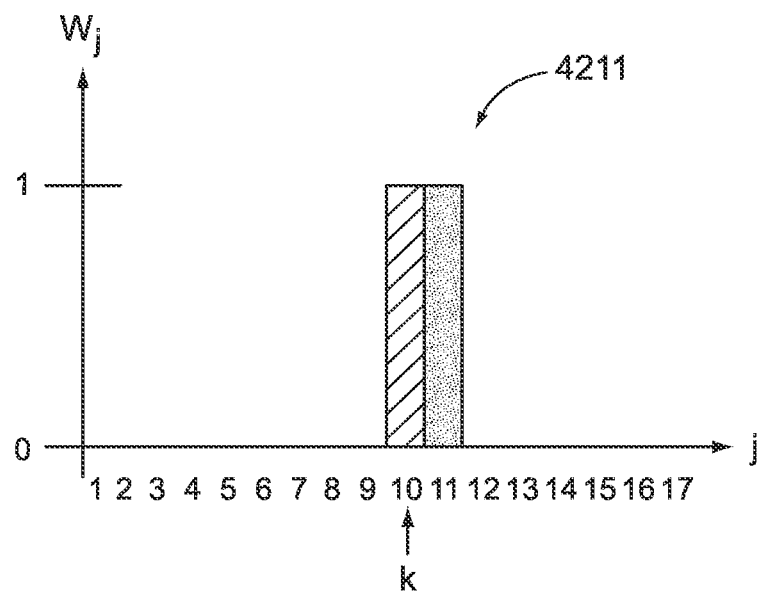

As defined above, "k" is the value of index j corresponding to the maximum touch induced signal, also referred to herein as the local maximum signal. Equation (6) repeats this statement in mathematical form. Electrode k overlaps the center, such as the center 200 of FIG. 1A, or is in close proximity to the center of the touch contact area. Two weighting schemes that favor signals at the interior of the touch contact area may be referred to herein as "left central pair" and "right central pair" weighting schemes and are defined by Equations (7) and (8), respectively. Left central pair weighting 4210 and right central pair weighting 4211 are illustrated in FIGS. 4A and 4B, respectively, for the example of the touch signal cluster 1210 of FIG. 2.

$$Q_k=\text{Max}\{Q_j\}=\text{Maximum over all } j \text{ in cluster of } Q_j \quad (6)$$

$$w_k=1; w_{k-1}=1; \text{ all other } w_j=0 \quad (7)$$

$$w_k=1; w_{k+1}=1; \text{ all other } w_j=0 \quad (8)$$

Substituting weights of Equations (7) and (8) into Equation (5) gives Equations (9) and (10) respectively for computing the vertical coordinate based on left and right central pair weighting. In terms of the offset and scaled vertical coordinate $Y'=(Y+1)/2$, Equations (9) and (10) are equivalent to Equation (11) where taking the minus sign of "±" corresponds to Equation (9) and taking the plus sign corresponds to Equation (10).

$$Y=\{(-1)^{k-1} \cdot Q_{k-1}+(-1)^k \cdot Q_k\}/(Q_{k-1}+Q_k) \quad (9)$$

$$Y=\{(-1)^k \cdot Q_k+(-1)^{k+1} \cdot Q_{k+1}\}/(Q_k+Q_{k+1}) \quad (10)$$

$$Y'=Q_k/(Q_k+Q_{k\pm1}) \text{ for } k \text{ even}; Q_{k\pm1}/(Q_k+Q_{k\pm1}) \text{ for } k \text{ odd} \quad (11)$$

In some embodiments, the left and right central pair weighted estimations of Y may be used as building blocks in the construction of more sophisticated algorithms involving conditional logic and/or averaging of multiple Y estimates. There is some ambiguity of choice between left central pair weighting and right central pair weighting, however, and thus in some embodiments additional considerations may be used to determine the weighting scheme.

Figure 5:
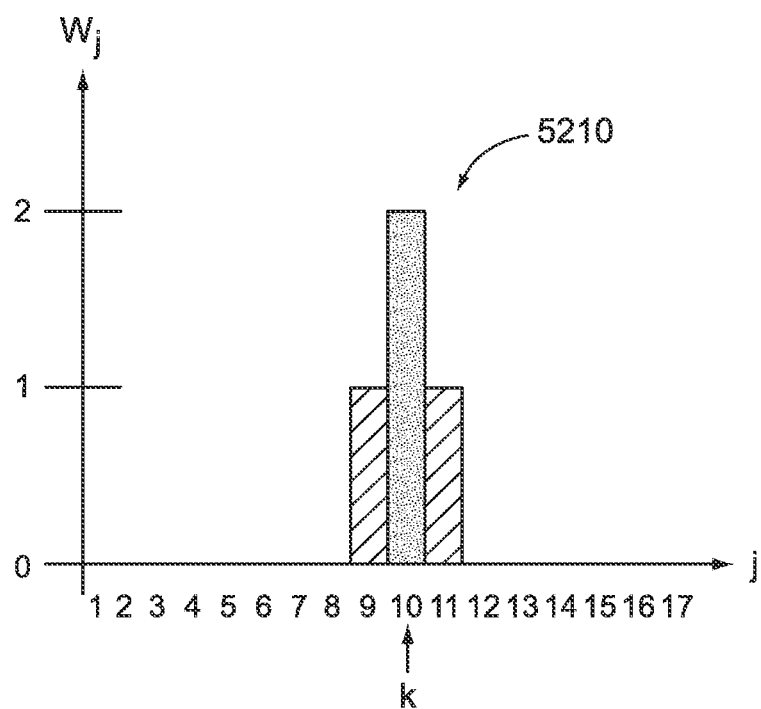
FIG. 5 illustrates weights for central triple weighting in accordance with an embodiment of the present invention.

In one embodiment, central triple weighting given in Equation (12) may be used to eliminate the left/right ambiguity of left and right central pair weighting 4210 and 4211 shown in FIGS. 4A and 4B. FIG. 5 illustrates central triple weighting 5210 for signal cluster 1210 of FIG. 2 corresponding to touch contact area 210 of FIG. 1. For example, in embodiments wherein a touch contact area overlaps five or more sense electrodes, central triple weighting 5210 may be used to compute the vertical coordinate.

$$w_{k-1}=1; w_k=2; w_{k+1}=1; \text{ all other } w_j=0 \quad (12)$$

Therefore, in central triple weighting, the controller 250 weights the interior electrode 110, which is also the electrode that generates the local maximum signal, with twice as much weight as the electrodes 109 and 111 that are adjacent to the electrode 110. In other words, the controller 250 applies a weight that has a relatively larger numerical value to the signal from the electronic channel that has the local maximum signal and applies weights with a relatively smaller numerical value to the signal from the electronic channels that are adjacent to the electronic channel that has the local maximum signal. In one embodiment, the relatively larger numerical value may be approximately twice the relatively smaller numerical value. In the example of FIG. 1A, the other adjacent electrodes 106-108 and 112-114 that form the series of adjacent electrodes that generate the signal cluster 1210 of FIG. 2 are given a weight of zero. In some embodiments, the other adjacent electrodes 106-108 and 112-114 may be given a weight that is not zero but that is also less than the relatively smaller numerical value. It should be understood that the numerical values of the weights, such as $w_j$ of zero, 1 and 2 as shown in FIG. 5, are exemplary only, and that other numerical values may be used.

Figure 6:
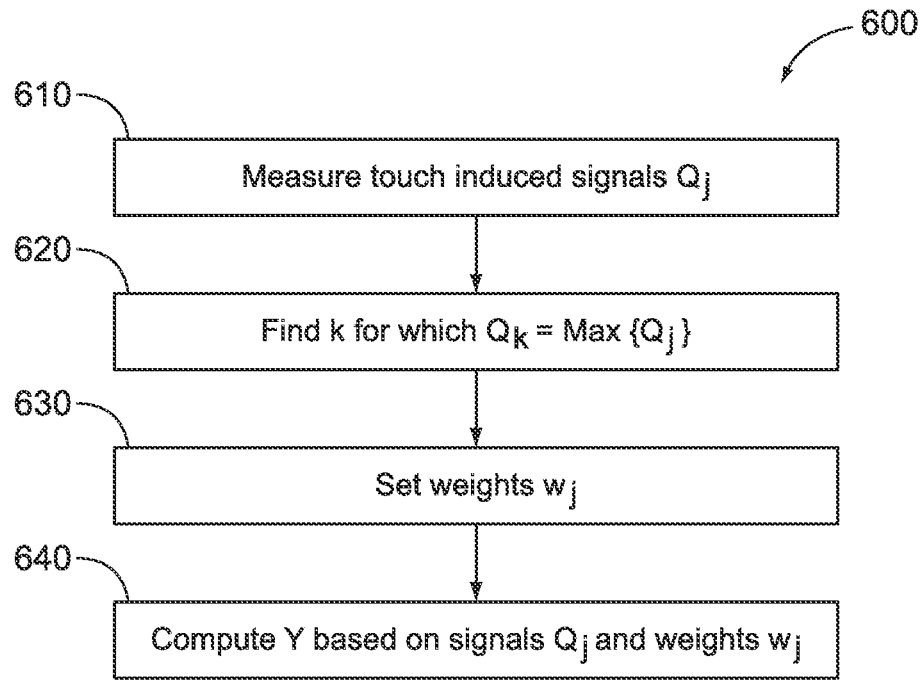
FIG. 6 illustrates a flow chart for weight based coordinate calculation in accordance with an embodiment of the present invention.

The flow chart 600 of FIG. 6 illustrates an exemplary use of weights such as those of Equation (12). At 610, touch induced signals $Q_j$ are measured, such as by the controller 250. At 620, the controller 250 determines the index k of the electrode with the maximum touch signal. Knowing the index k, at 630 the controller 250 may assign weights $w_j$, for example via Equation (12), so that signals corresponding to the electrodes located near the electrode of index k are more heavily weighted or are assigned weights with larger numerical values than the electrodes located further from the electrode of index k. With weights assigned, at 640 the controller 250 may compute the vertical coordinate Y using Equation (5) or an offset and scaled version thereof.

The weights $w_j$ may be multiplied by a constant factor with no effect on the coordinate computed via Equation (5) as the numerator sum and the denominator sums are multiplied by the same constant factor. Thus there is no essential difference between the set of weights $[w_{k-1}=1; w_k=2; w_{k+1}=1]$ of Equation (12) and the set of weights $[w_{k-1}=\frac{1}{2}; w_k=1; w_{k+1}=\frac{1}{2}]$ and the set of weights $[w_{k-1}=10; w_k=20; w_{k+1}=10]$. It is understood that the weights $w_j$ may be scaled in any desired multiple for ease of coding purposes.

The weights of examples shown in FIGS. 4A, 4B and 5 are special cases of binomial weighting. Binomial weights may be determined by expanding the Nth power of a binomial as in Equation (13) and picking off the coefficients. Table 1 gives weights resulting in choices of binomial power N from one to 5.

$$(1+\alpha)^N=1\cdot\alpha^0+N\cdot\alpha^1+\{N(N-1)/2\}\cdot\alpha^2+\ldots+[(N!)/\{(n!)\cdot(N-n)!\}]\cdot\alpha^n+\ldots+1\cdot\alpha^N \quad (13)$$

TABLE 1

| N | Weights |
|---|---|
| 1 | 1, 1 |
| 2 | 1, 2, 1 |
| 3 | 1, 3, 3, 1 |
| 4 | 1, 4, 6, 4, 1 |
| 5 | 1, 5, 10, 10, 5, 1 |

Figure 7:
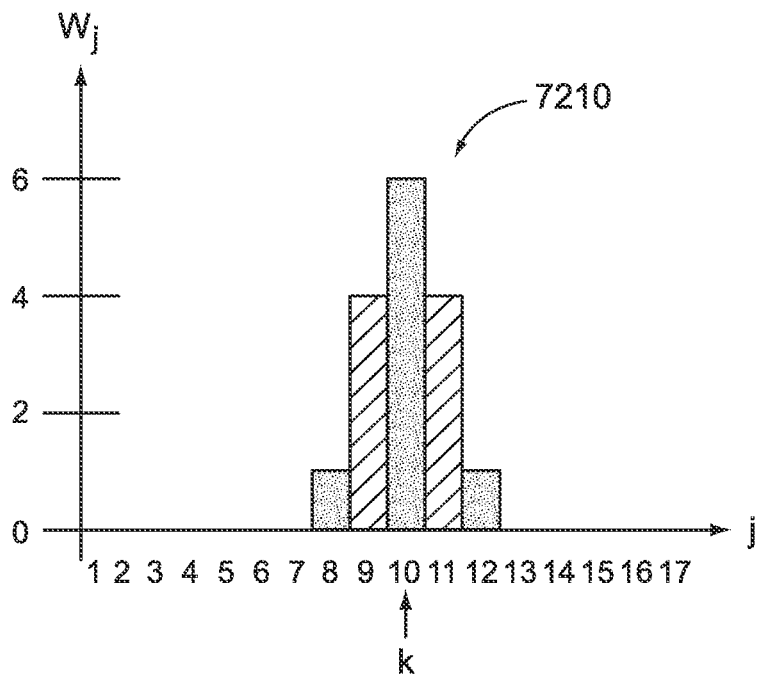
FIG. 7 illustrates weights for central quintuple weighting in accordance with an embodiment of the present invention.

For N=1, Table 1 reproduces the weights of the central pair of FIGS. 4A and 4B, and the weights for N=2 reproduce the central triple weights of FIG. 5. (Only the non-zero weights are shown in Table 1.) For odd values of N, there are two equal maximum weights and hence the left/right ambiguity encountered in FIGS. 4A and 4B. For even values of N, there is a single maximum weight $(N!)/((N/2)!)^2$ that can unambiguously be assigned to the signal $Q_k$ for the electrode of index k, which is the electrode with the local maximum signal. The value N=4 results in central quintuple weighting 7210 as shown in FIG. 7 of Equation (14) for signal cluster 1210 of FIG. 2.

$$w_{k-2}=1; w_{k-1}=4; w_k=6; w_{k+1}=4; w_{k+2}=1; \text{ all other } w_j=0 \quad (14)$$

A property of binomial weights, including all the examples in Table 1, is that the weights are balanced, or substantially balanced, between even and odd values of electrode index j. That is, the sum of $w_j$ for j odd (electrodes having a first orientation) equals the sum of $w_j$ for j even (electrodes having a second orientation that is opposite or alternate to the first orientation). It should be understood that small variations between the sums of weights are contemplated. In other words, the sum of a first set of weights having a first set of numerical values that is applied to the electronic channels associated with the electrodes that have the first orientation is the same or substantially the same as the sum of a second set of weights having a second set of numerical values that is applied to the electronic channels associated with the electrodes that have the second orientation. (This can be mathematically proven by setting $\alpha$ to negative one in Equation (13), noting the expression to the left is zero and that the expansion to the right reduces to a difference of even and odd sums.)

In the mathematical limit that the number J goes to infinity and the width of the electrodes goes to zero, the error in the conventional Y coordinate calculation of Equation (2) also goes to zero as desired. However, this is not necessarily the case for the weighted Y coordinate calculation of Equation (5). For many choices of values for weights the error in the Y coordinate calculation will remain non-zero even in the idealized case that the electrodes are infinitely narrow compared to the touch contact area. However, if weights $w_j$ are balanced, then Equation (5) will result in the desired limit of no Y coordinate error in the idealized mathematical limit of infinitely fine triangular electrodes.

Equation (15) provides an example of balanced weighting that is not binomial weighting. FIG. 8 illustrates an example of such weighting 8210 for the example of signal cluster 1210 of FIG. 2. Like a doughnut with a hole in the center, the central weight $w_k$ for the signal having the largest signal level, corresponding to j equal to 10, is zero. Both the central triple and central quintuple weighting schemes of FIGS. 5 and 7 may produce estimates of Y that are biased in the direction of the base of the electrode with index k, while doughnut weighting may be biased in the opposite direction towards the apex of the electrode with index k. Therefore, as discussed below, Y estimates based on doughnut weighting may form an interesting building block for computing vertical coordinates based on an average of different Y estimates.

$$w_{k-2}=1; w_{k-1}=1; w_k=0; w_{k+1}=1; w_{k+2}=1; \text{ all other } w_j=0 \quad (15)$$

In one embodiment, two or more weighting schemes may be combined to determine the location of the touch. If $Y_1, Y_2, \ldots, Y_M$ are M different estimates of the vertical coordinate Y of Equation (2) based on different weighting schemes, then a weighted average of these estimates may be provided as shown in Equation (16). The sum in Equation (16) is over values of index m from one to M. In one embodiment, the sum of the weighting coefficients $C_m$, equals one, so that in the special case that all values $Y_m$, of the different estimates are correct, so is the resulting Y value computed by Equation (16).

$$Y=\Sigma C_m \cdot Y_m \quad (16)$$

For example, if M=2, $C_1$ and $C_2$ are both one-half, and $Y_1$ and $Y_2$ are the vertical coordinate estimates calculated using left and right central pair weighting respectively, then Y of Equation (16) becomes the average of the results from left and right central pair weighting. This is one way to resolve the left/right ambiguity of FIGS. 4A and 4B.

In another embodiment, Y estimate averaging may be determined by computing a weighted average of the vertical coordinate computed with the central triple weighting of Equation (12) and the vertical coordinate computed with the doughnut weighting of Equation (15). The central triple weighting 5210 of Equation (12) generally leads to an error in the direction of the base of the electrode with the maximum signal and index k while the doughnut weighting of Equation (15) generally leads to an error in the opposite direction, and thus averaging tends to cancel these errors. The magnitudes of the errors of the two estimates typically differ so that the cancelling of errors may in some cases be achieved via a weighted average of estimates as in Equation (16) rather than a simple un-weighted average. Furthermore, simulation studies indicate that the errors associated with central triple weighting and doughnut weighting go to zero at different rates as the touch contact area 210 increases, so it may be advantageous for the coefficients $C_m$, of Equation (16) to be functions of relevant measurable parameters such as total touch signal $\Sigma Q_j$.

The choice of weights used in Equation (5) may be selected by the controller 250, such as by run time code, based on various conditions related to the touch signal data $Q_j$. Flow chart 900 of FIG. 9 illustrates an example of conditional weighting to apply one weighting scheme. After touch induced signals Qj have been measured, at 910 the controller 250 may determine the index k of the electronic channel with the maximum signal. At 920, the controller 250 may compare the signals of the electronic channels that are semi-adjacent to the electronic channel with the maximum signal to a signal threshold. If both of the signals of the semi-adjacent electronic channels are greater than the signal threshold, the process flow goes to 930 and the vertical coordinate calculation is based on central triple weighting 5210. Therefore, in one embodiment, if the touch contact area 210 is relatively large, such as including at least portions of five or more electrodes, then central triple weighting 5210 may be used. In another embodiment, a relatively large contact area may also be defined as including at least five adjacent electronic channels, wherein each of the electronic channels is connected to two or more semi-adjacent electrode as previously discussed.

Returning to 920, if at least one of signals generated by the electronic channels that are semi-adjacent to the electronic channel with the maximum signal is less than the signal threshold, then the touch contact area may be relatively small, such as covering less than five electrodes as shown with the touch contact area 230 of FIG. 1A. In another embodiment, a relatively small touch contact area may include less than five adjacent electronic channels. In this example, the method passes to 940.

At 940, the signals generated by the electronic channels that are adjacent to the electronic channel with the maximum signal are compared to a signal threshold. If neither of the signals from the adjacent electronic channels exceeds the signal threshold, then there may be insufficient information to reliably reconstruct touch coordinates and process flow passes to 950 where the controller 250 may reject the signals associated with the touch contact area and no coordinates are reported.

If at least one adjacent electronic channel has a signal that is above the signal threshold, then process flow passes to 960 to determine whether left or right central pair weighting 4210 and 4211 may be used. At 960, the controller 250 compares the signals from the adjacent electronic channels to each other. Process flow then passes to either vertical coordinate calculation 970 based on left central pair weights or vertical coordinate calculation 980 based on right central pair weights depending on whether the left adjacent electronic channel or right adjacent electronic channel has the larger touch induced signal.

Weights having negative numerical values, as well as possibly negative coefficients $C_m$, of Equation (16), are also contemplated. The optional use of negative values provides more freedom to tune algorithms to specific applications. It is to be understood that in comparing "larger" and "smaller" values of weights, "larger" and "smaller" refers to the magnitude or absolute value of the values of the weights.

As discussed below, the examples above can be generalized in various ways.

If the longitudinal axes of the electrodes are oriented horizontally as in electrode pattern 1100 shown in FIG. 10 rather than vertically as in FIG. 1 nothing changes at a conceptual level. However, in this case the vertical coordinate "Y" in direction 1180 in equations (2) through (5) as well as (9) through (11) is replaced by the horizontal coordinate "X" in direction 1170.

In one embodiment, the number of triangularly shaped electrodes may exceed the number of available electronic channels 254-268 and each electronic channel 254-268 within the controller 250 may correspond to a group of semi-adjacent electrodes. For example, referring to FIG. 10, a group 1020 of three semi-adjacent electrodes 1002, 1004 and 1006 may be electrically connected to a conductive trace 1010 which is in turn connected to the electronic channel 260 (as shown in FIG. 1) which measures touch signal $Q_5$. In another embodiment, groups of five semi-adjacent electrodes may be electrically connected together wherein each group is connected to one electronic channel. In other embodiments, other numbers of semi-adjacent electrodes may be electrically connected together to form groups. For such grouped electrode designs, j is interpreted as an index over electronic channels and J as the total number of available electronic channels. Except for a generalized interpretation of j as an index over electronic channels rather than necessarily individual sense electrodes, Equation (5) continues to be used in the same fashion to compute a coordinate parallel to the longitudinal axis of the sense electrodes as a function of touch signals $Q_j$.

Three semi-adjacent electrodes 1026, 1028 and 1030 are electrically connected to a conductive trace 1032 into group 1022, which may be connected to the electronic channel 262. Also, three semi-adjacent electrodes 1034, 1036 and 1038 are electrically connected to a conductive trace 1040 into group 1024, which may be connected to the electronic channel 264. Therefore, group 1022 is adjacent to both groups 1020 and 1024, and group 1020 is semi-adjacent to group 1024. In some embodiments, each group may have more than three electrodes, and in other embodiments, at least one group may have a different number of electrodes compared to other groups.

A touch contact area 1050 may generate a signal cluster (not shown) that includes the signals from the series of adjacent electronic channels 260, 262 and 264.

Both single touch and multiple touch operation may be supported by the above methods by limiting the index sum of each application of Equation (5) to a signal cluster of touch signals, or to a region containing a signal cluster of touch induced signals.

Coordinates computed as described in the various embodiments above may be further processed with temporal filtering or temporal decision making before being passed on to the operating system. For example, a time sequence of five computed coordinates $(X_1, Y_1)$, $(X_2, Y_2)$, $(X_3, Y_3)$, $(X_4, Y_4)$ and $(X_5, Y_5)$ may be processed by a temporal filter to produce time smoothed coordinates (X,Y) where $X=(X_1+2X_2+2X_3+2X_4+X_5)/8$ and $Y=(Y_1+2Y_2+2Y_3+2Y_4+Y_5)/8$. Alternate temporal filters may use longer or shorter time sequences of computed coordinates, use different weighting coefficients, or be based on recursive formulas. An example of temporal decision making is to report coordinates to the operating system only if coordinates were successfully computed as illustrated in FIG. 9 in all of the previous five scans of signals $Q_j$. Temporal decision making may also involve rejection of computed coordinates corresponding to highly improbable finger motion; for example if a time sequence of computed (x,y) touch coordinates form a smooth trajectory except for one spurious computed (x,y) position at a far remote location, such a spurious computed position may be rejected. Many other temporal filter and temporal decision making methods may be applied to time sequences of coordinates computed from the touch induced signals $Q_j$.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. This written description uses examples to disclose the invention, including the best mode, and also to enable any person skilled in the art to practice the invention, including making and using any devices or systems and performing any incorporated methods. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A capacitive touchscreen system, comprising:
   a substrate comprising a touch sensitive area;
   electrodes provided on the substrate within the touch sensitive area, the electrodes having substantially triangular shapes, the electrodes being interlaced with one another in a non-overlapping pattern on the substrate, the electrodes each having a longitudinal axis that defines a coordinate axis parallel to the longitudinal axis, the electrodes configured to generate corresponding signals in response to a touch on the substrate;
   a controller; and
   electronic channels within the controller, each of the electronic channels being connected to one electrode or to a group of semi-adjacent electrodes, the controller configured to detect the signals from the electronic channels and to identify a signal cluster comprising the signals from a series of at least two adjacent electronic channels, the controller identifying a first electronic channel within the series that has a local maximum signal, the controller applying a first weight with a first numerical value to a first signal from the first electronic channel that has the local maximum signal to generate a first weighted signal and applying a second weight with a second numerical value to a second signal from a second electronic channel within the series to generate a second weighted signal, the first numerical value being different than the second numerical value, the controller determining a location of the touch along the coordinate axis based on the first weighted signal and the second weighted signal.

2. The system of claim 1, wherein the controller is further configured to to apply a third weight with a relatively smaller numerical value than the second weight to a third signal from a third electronic channel within the series that is relatively further from the first electronic channel that has the local maximum signal than the second electronic channel.

3. The system of claim 1, wherein the controller is further configured to identify the series by identifying adjacent electronic channels that have signals that are above a signal threshold.

4. The system of claim 1, wherein the first numerical value is larger than the second numerical value.

5. The system of claim 1, wherein the controller is further configured to apply the second weight with the second numerical value to at least one of the electronic channels within the series that are located on either side of the first electronic channel with the local maximum signal, and wherein the controller is further configured to apply a third weight with a third numerical value to a signal of at least one other of the electronic channels within the series, wherein the first numerical value is larger than the second numerical value and the second numerical value is larger than the third numerical value.

6. The system of claim 1, wherein the controller is further configured to apply the first weight with the first numerical value to a signal of at least one of the electronic channels within the series that is adjacent to the first electronic channel with the local maximum signal.

7. The system of claim 1, wherein the controller is further configured to apply a third weight with a numerical value of approximately zero to signals from the electronic channels within the series that have signal levels below a signal threshold.

8. The system of claim 1, wherein the signal cluster further comprises signals from a series of at least three adjacent electronic channels, wherein the first numerical value is larger than the second numerical value, and wherein the second weight with the second numerical value is applied to electronic channels that are located on either side of the first electronic channel that has the local maximum signal.

9. The system of claim 1, wherein the first numerical value is approximately zero and the second numerical value is greater than the first numerical value.

10. The system of claim 1, wherein the first numerical value is approximately twice as large as the second numerical value.

11. The system of claim 1, wherein the first and second numerical values are determined based on binomial weighting.

12. The system of claim 1, wherein at least a portion of the electrodes are electrically connected into groups of at least three semi-adjacent electrodes, the controller configured to detect one signal from each of the groups of at least three semi-adjacent electrodes.

13. A method for identifying a touch location on a capacitive touchscreen system, comprising:
    receiving signals in response to a touch from electronic channels that are each connected to one electrode or to a group of semi-adjacent electrodes of electrodes provided on a substrate, adjacent ones of the electrodes having substantially triangular shapes that alternate between a first and second orientation to form an interleaved arrangement such that the touch generates a signal cluster comprising the signals generated from a series of adjacent electronic channels, the electrodes each having a longitudinal axis that defines a coordinate axis parallel to the longitudinal axis;
    applying weights with at least two different numerical values to the signals from the series of adjacent electronic channels to generate weighted signals, the at least two different numerical values being based on levels of the signals from the series of adjacent electronic channels; and determining a location of the touch on the substrate along the coordinate axis based on the weighted signals.

14. The method of claim 13, wherein the applying weights further comprises applying a first weight with a smaller numerical value to a first signal from a first electronic channel within the series that has a maximum signal level and applying a second weight with a larger numerical value to a second signal from a second electronic channel within the series that has a signal level that is less than the maximum signal level.

15. The method of claim 13, wherein the applying weights further comprises applying a first set of weights having a first set of numerical values to at least a first portion of first electrodes within the series that have the first orientation and applying a second set of weights having a second set of numerical values to at least a second portion of second electrodes within the series that have the second orientation, and wherein the sums of first and second sets of numerical values are substantially the same.

16. The method of claim 13, wherein the weights with at least two different numerical values comprises a first set of weights, the method further comprising:

applying a second set of weights with at least two different numerical values to the signals from the series of electronic channels to generate second weighted signals, the second set of weights being different than the first set of weights; and further determining the location along the coordinate axis based on an average of the weighted signals based on the first set of weights and the second weighted signals based on the second set of weights.

17. The method of claim 13, further comprising:

comparing levels of the signals from the electronic channels within the series to a signal threshold; and selecting the numerical values of the weights based on the comparison.

18. The method of claim 13, further comprising:

identifying an electronic channel from the series of adjacent electronic channels that has a maximum signal; and discarding the signals from the electronic channels within the series of adjacent electronic channels when a level of signals from two electronic channels that are adjacent to the electronic channel that has the maximum signal are less than a signal threshold.

19. The method of claim 13, further comprising:

identifying an electronic channel from the series of adjacent electronic channels that has a maximum signal level with respect to levels of signals from other electronic channels within the series;

comparing the levels of the signals from the other electronic channels from within the series to at least one signal threshold; and determining the at least two different numerical values of the weights based on the comparison.

20. The method of claim 13, further comprising:

receiving second signals in response to a second touch that generates a second signal cluster comprising signals generated from a second series of adjacent electronic channels that is distinct from the series of adjacent electronic channels generating the signal cluster, the second signal cluster being detected simultaneously with the signal cluster;

applying weights with at least two different numerical values to the second signals associated with the second signal cluster to generate second weighted signals; and determining a location of the second touch on the substrate along the coordinate axis based on at least the second weighted signals associated with the second touch.

* * * * *

UNITED STATES PATENT AND TRADEMARK OFFICE
CERTIFICATE OF CORRECTION

PATENT NO. : 8,477,106 B2
APPLICATION NO. : 12/511449
DATED : July 2, 2013
INVENTOR(S) : Ricardo R. Salaverry et al.

Page 1 of 1

It is certified that error appears in the above-identified patent and that said Letters Patent is hereby corrected as shown below:

In the Claims

Claim 15 Column 15

Line 20 "sums of first and second" should read --sums of the first and second--

Signed and Sealed this
Tenth Day of September, 2013

Teresa Stanek Rea
*Acting Director of the United States Patent and Trademark Office*